United States Patent [19]
Hrovat et al.

[11] Patent Number: 5,432,700
[45] Date of Patent: Jul. 11, 1995

[54] ADAPTIVE ACTIVE VEHICLE SUSPENSION SYSTEM

[75] Inventors: Davorin D. Hrovat, Dearborn, Mich.; William T. Tseng, Saratoga, Calif.

[73] Assignee: Ford Motor Company, Dearborn, Mich.

[21] Appl. No.: 994,010

[22] Filed: Dec. 21, 1992

[51] Int. Cl.$^6$ ............................................. B60G 17/015
[52] U.S. Cl. .................................. 364/424.05; 280/707
[58] Field of Search ................... 364/424.05; 280/707, 280/840

[56] References Cited

U.S. PATENT DOCUMENTS

| | | | |
|---|---|---|---|
| 4,281,188 | 4/1989 | Ikemoto et al. | 280/707 |
| 4,826,141 | 5/1989 | Buma et al. | 280/707 |
| 4,827,416 | 5/1989 | Kawagoe et al. | 280/707 |
| 4,872,116 | 10/1989 | Ito et al. | 364/424.05 |
| 4,897,776 | 1/1990 | Urababa et al. | 280/707 |
| 4,924,392 | 5/1990 | Kurosawa | 280/707 |
| 4,924,393 | 5/1990 | Kurosawa | 280/707 |
| 4,927,170 | 5/1990 | Wada | 280/707 |
| 4,934,732 | 6/1990 | Fukunaga et al. | 280/707 |
| 4,936,604 | 6/1990 | Kawagoe et al. | 280/707 |
| 4,937,748 | 6/1990 | Yonekawa et al. | 280/707 |
| 4,948,164 | 8/1990 | Hano et al. | 280/707 |
| 4,949,261 | 8/1990 | Ito et al. | 280/707 |
| 4,949,262 | 8/1990 | Buma et al. | 280/707 |
| 4,951,207 | 8/1990 | Furukawa et al. | 280/707 |
| 5,134,566 | 7/1992 | Yokoya et al. | 364/424.05 |
| 5,142,477 | 8/1992 | Tsutsumi et al. | 280/707 |
| 5,243,525 | 9/1993 | Tsutsumi et al. | 280/707 |
| 5,322,319 | 6/1994 | Tanaka et al. | 364/424.05 |

OTHER PUBLICATIONS

D. Hrovate et al, "A Comparison Between Jack Optimal and Acceleration Optimal Vibration Isolation", Journal of Sound and Vibration (1987) 112:201–210.

D. Hrovat, "Influence of Unsprung Weight on Vehicle Ride Quality", Journal of Sound and Vibration (1988) 124:497–516.

Primary Examiner—Gary Chin
Attorney, Agent, or Firm—Gregory P. Brown; Roger L. May

[57] ABSTRACT

An adaptive active suspension system for a wheeled vehicle in which a powered actuator supplies a force between an unsprung wheel assembly and the vehicle body. The actuator is controlled by a signal from a feedback control system whose dynamic properties are determined by control gain values stored in a memory. The stored control gain values are calculated to simultaneously reduce vehicle body acceleration, tire deflection and suspension displacement (stroke). A road profile estimator provides an indication of predicted road roughness and, as road roughness varies, the effective stiffness of the suspension system is adaptively altered while maintaining a substantially constant ratio between tire deflection and suspension stroke. To reduce the computational burden on the system, the control gains are pre-computed for a range of varying road conditions and stored in memory. The current control gains in effect may be updated on a substantially continuous basis or, to further reduce the amount of computing required, may be altered only when the current estimate of road roughness departs from a predetermined range of values.

8 Claims, 7 Drawing Sheets

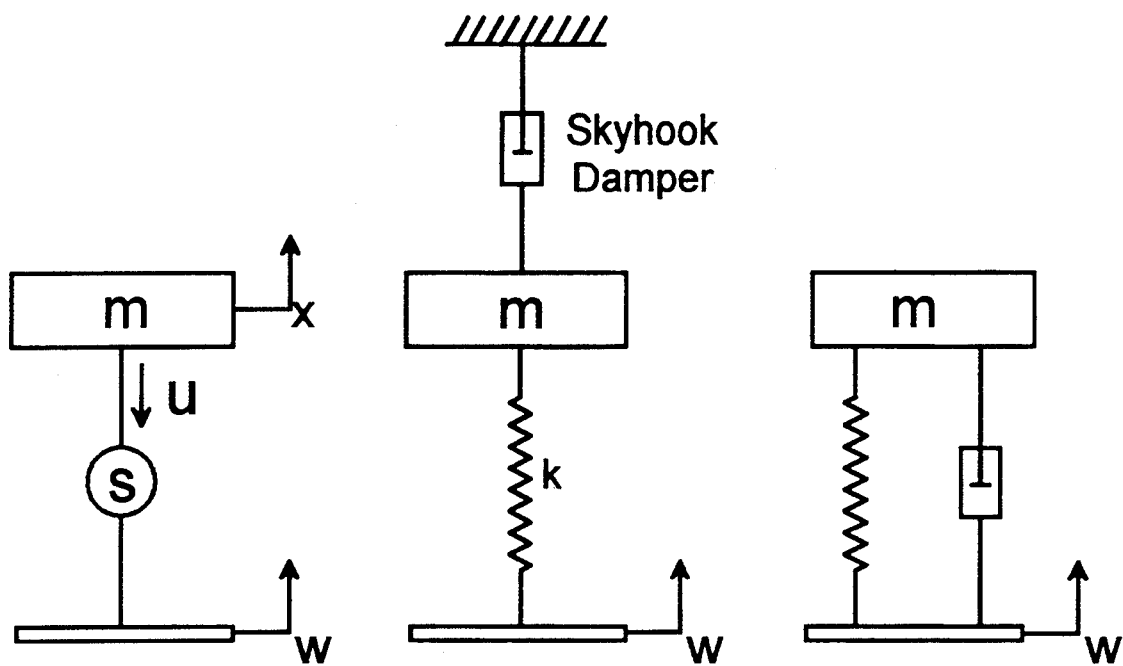
Fig. 1(a) Prior Art
Fig. 1(b) Prior Art
Fig. 1(c) Prior Art
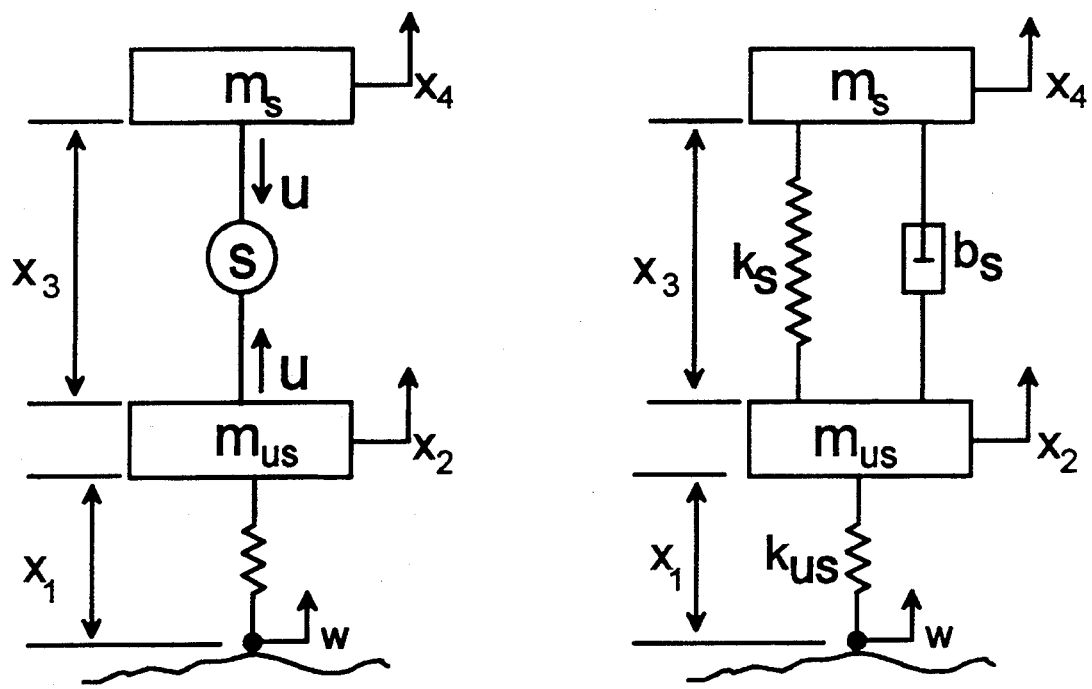
Fig. 1(d) Prior Art
Fig. 1(e) Prior Art

ADAPTIVE ACTIVE VEHICLE SUSPENSION SYSTEM

FIELD OF THE INVENTION

This invention relates to vehicle suspension systems for movably mounting wheels on a vehicle body in optimum ways to enhance passenger comfort and improve the vehicle's handling characteristics.

SUMMARY OF THE INVENTION

The present invention takes the form of an adaptive, active suspension system in which powered actuators are used to apply forces between a vehicle's body and wheels, the magnitude of the forces being computed in accordance with optimization routines which are themselves altered to adapt to changing driving conditions.

In accordance with the invention, control variables which determine the dynamic characteristics of the suspension system are modified, either continuously or in discrete steps, in response to changing driving conditions to control the "stiffness" of the suspension system while maintaining a preferred relationship between the amount of tire deflection experienced by the vehicle's pneumatic tires and the displacement which occurs between the wheels and the vehicle body. The maintenance of this preferred relationship between the tire's deflection and the suspension stroke provides near optimum performance while greatly simplifying control system functions.

The adaptive suspension system contemplated by the present invention includes means for estimating the amount of tire deflection and/or stroke displacement which may be expected, and means for altering the effective stiffness and other dynamic characteristics of the suspension system in response to deviations in the estimate.

In the preferred embodiment of the invention to be described, the dynamic characteristics of the system are adaptively varied in response to changing road conditions in a manner that minimizes a performance index value equal to the weighted combination of three quantities:

(1) the acceleration of the vehicle body,
(2) the length of the suspension stroke, and
(3) the amount of tire deflection. The dynamic characteristics of the system are varied by altering the significance accorded to vehicle body acceleration relative to the significance accorded to the suspension stroke and tire deflection, while at the same time maintaining the significance of suspension stroke and tire deflection relative to one another at a predetermined preferred ratio.

The control gains which determine the dynamic characteristics of an adaptive, active suspension system, including its "stiffness," are advantageously calculated in advance, based on the characteristics of the physical system, and the resulting gain values are stored in a memory lookup table. The set of control gains which are appropriate for detected driving conditions are then retrieved and used to minimize vehicle body acceleration (for passenger comfort), tire deflection (for vehicle handling), and suspension stroke displacement (to remain within physical space limits).

In accordance with the invention, new control values are substituted to alter the characteristics of the suspension system to maintain the predicted tire defection and stroke displacement within predetermined desired limits. As a consequence, the suspension system is made effectively stiffer when rougher road conditions are predicted to avoid both excessive wheel-bounce and stroke displacement, and made effectively softer when good road conditions permit stroke displacement and tire deflection to be increased relative to sprung mass accelerations for greater passenger comfort.

In accordance with the invention, the control gains supplied to control the characteristics of the active suspension system may be advantageously altered in discrete steps, thereby reducing the computational burden on the adaptive control processor, or may be updated continuously for improved performance when computational capabilities permit.

These and other objects, features and advantages of the invention may be better understood by considering the following detailed description of a preferred embodiment of the invention. In the course of that description, reference will frequently be made to the attached drawings, in which:

BRIEF DESCRIPTION OF THE DRAWINGS

FIGS. 1(a)-1(c) illustrate idealized models of physical vehicle suspension systems which are commonly used to represent the performance of such systems;

DESCRIPTION OF PREFERRED EMBODIMENTS

Figure 2:
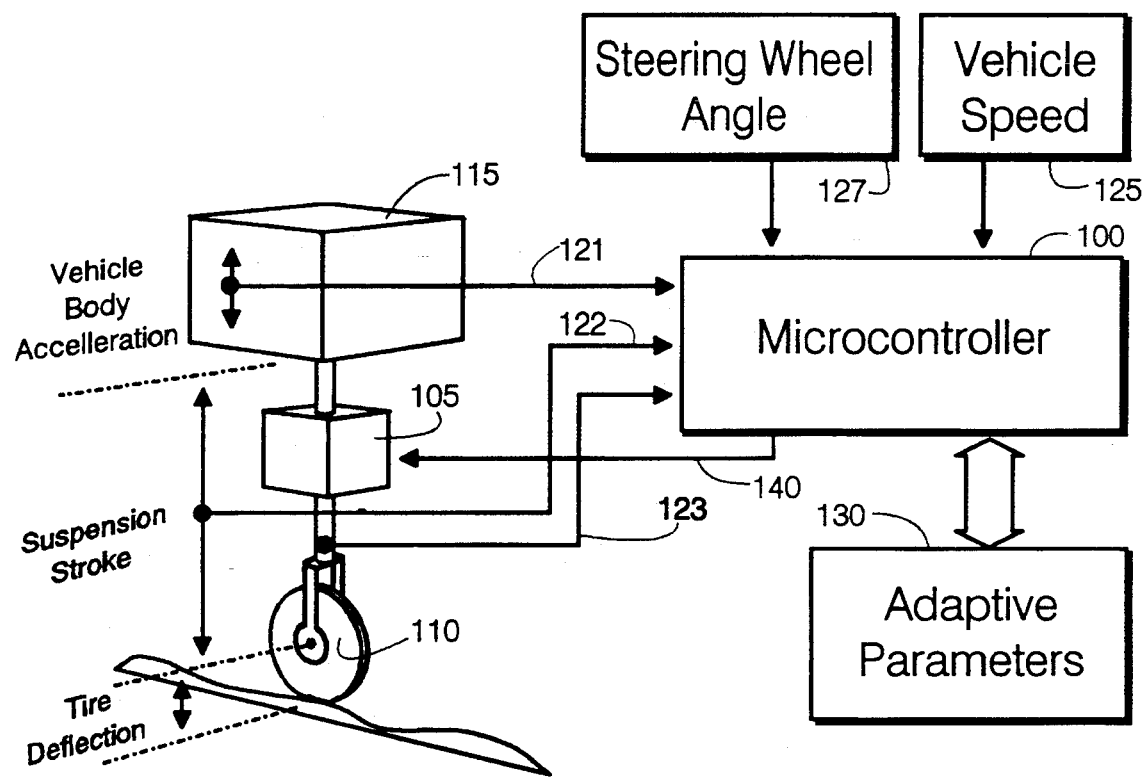
FIG. 2 is an illustration of an active suspension system contemplated by the invention.

The adaptive, active suspension system to be described makes use of analytical and computational methods which have been described in considerable detail in the published literature, including particularly the references cited in the listing which appears below. Where these publications are referred to in the text that follows, they are identified by their list numbers in brackets. Also, in the description to follow, numbered equations are presented, and these equations are referred to in the text by numbers enclosed in parentheses.

REFERENCES

1. Morman, K. N., Jr., and Giannopoulos, F., "Recent Advances in the Analytical and Computational Aspects of Modeling Active and Passive Vehicle Suspensions", *Computational Methods in Ground Transportation Vehicles*, (M. M. Kamal and J. A. Wolf, Jr., eds.) ASME Publication AMD 50, pp. 75–115, December 1982.

2. Bryson, A. E., Jr. and Ho, Y. C., *Applied Optimal Control*, John Wiley & Sons, New York, 1975.
3. Bender, E. K., "*Optimization of the Random Vibration Characteristics of Vehicle Suspensions Using Random Process Theory*" Sc. D. Thesis, M.I.T., 1967.
4. Karnopp, D. C. and Trikha, A. K., "Comparative Study of Optimization Techniques for Shock and Vibration Isolation", *ASME Journal of Engineering for Industry*, Vol. 91, No. 4, November 1969, pp. 1128–1132.
5. Sevin, E. and Pilkey, W. D., *Optimum Shock and Vibration Isolation, Shock and Vibration Monograph 6*, The Shock and Vibration Information Center, Naval Research Laboratory, Washington, D.C., 1971.
6. Smith. C. C., McGehee, D. Y., and Healey, A. J., "The Prediction of Passenger Riding Comfort from Acceleration Data", *Journal of Dynamic Systems, Measurement and Control*, Series G, Vol. 100, March 1978.
7. Karnopp, D. C., Crosby, M. J., and Harwood, R. A., "Vibration Control Using Semi-Active Force Generators", ASME Paper No. 73-DET-122.
8. Margolis, D. L., Tylee, J. L. and Hrovat, D., "Heave Mode Dynamics of a Tracked Air Cushion Vehicle with Semiactive Airbag Secondary Suspension", *Journal of Dynamic Systems, Measurement and Control, Transactions of the ASME*, Series G, Vol. 97, No. 4, December 1975.
9. Roley, D. G., "*Tractor Cab Suspension Performance Modeling*", Ph. D Dissertation, Department of Agricultural Engineering, University of California-Davis, 1975.
10. Hrovat, D. and Margolis, D. L., "An Experimental Comparison Between Semi-Active and Passive Suspensions for Air-Cushion Vehicles", *International Journal of Vehicle Design*, Vol. 2, No. 3, August 1981, pp. 308–321.
11. Hullender, D. A., Wormley, D. N. and Richardson, H. H., "Active Control of Vehicle Air Cushion Suspensions", *Journal of Dynamic Systems Measurement and Control, Transactions of the ASME*, Series G, Vol. 94, No. 1, March 1972, pp. 41–49.
12. *Matrixx User's Guide*, Integrated Systems, Inc., Version 6, Palo Alto, Calif., May 1986.
13. Hrovat, D. and Margolis, D. L., "Realistic Road-Track Systems Simulation Using Digital Computers", *Proceedings of the Winter Computer Simulation Conference*, Sacramento, Calif., December 1975.
14. Hrovat, D. "Influence of Unsprung Weight on Vehicle Ride Quality", *Journal of Sound and Vibration* (1988) 124 (3), pp 497–516.

CONTROL THEORY

Optimal control theory has been used since at least the 1960's to investigate potential benefits of active suspension systems [1,2]. Early investigations [3,4] used the simplest possible, one degree-of-freedom, quarter-car vehicle model shown in FIG. 1(a), in which wheel dynamics are not been modeled. In FIG. 1(a), m represents the vehicle mass, S represents an active suspension actuator, such as an electro-hydraulic servo actuator, and w signifies the road roughness input velocity function.

As a standard practice for suspension system analysis, the ground roughness w is assumed to be a white-noise velocity input process. Since it is impossible to predict all possible ground inputs to be encountered during vehicle life, a random representation for the road input is the most logical, single-test road description. This simplification is supported, in addition, by experimental data [5].

Under this road description, the optimal vibration isolation problem was formulated in [2, 3] as the minimization of the following performance index:

$$P.I. = x^2_{rms} + r\, u^2_{rms} \qquad (1)$$

where the quantity $x_{rms}$ is the rms suspension deflection from equilibrium (often termed "stroke" or "rattlespace"), $U_{rms}$ is the rms value of the acceleration experienced by the sprung mass (the vehicle body) and is hence proportional to the force exerted by the actuator S, and r is a "tuning parameter" chosen by the designer to determine the stiffness and other characteristics of the suspension; i.e., a larger r results in a softer suspension since the performance index is minimized at smaller acceleration and larger rattlespace values.

The rms acceleration $U_{rms}$ is probably the simplest measure representative of passengers comfort [6]. The rms suspension deflection $X_{rms}$ is a measure of design constraint on available suspension stroke. Under the above-noted assumption of a Gaussian "white noise" velocity function w due to road roughness, the probability of maximum deflection being above a certain level is a simple function of rms deflection. For example, the deflection will in general be above three times the rms value only during 0.3% of ride time.

Thus the optimal control algorithm that results from the minimizing the performance index expressed in equation (1) will attempt to improve passengers comfort while satisfying the suspension stroke design constraint. The optimal control algorithm results in the optimal structure shown in FIG. 1(b). For comparison, the conventional passive suspension system using a spring and a shock absorber is shown in FIG. 1(c). Both passive and active suspensions have a support spring located between the vehicle and ground; however, the mounting points for the optimal damper (also known as "skyhook damper") are located between the vehicle and an inertial ground. Inertial ground is essentially the low-frequency "smooth" component of road inputs, and as such it is generally not available to a moving vehicle. Thus a practical implementation of the skyhook damper requires an active actuator where an external power source in the form of hydraulic pump or compressor, for example, is needed.

The one degree-of-freedom (DOF) vehicle models depicted in FIGS. 1(a) through 1(c) discussed above adequately represent the dominant dynamics of some advanced air cushion and magnetically levitated vehicles having only the primary suspension [10]. When the one DOF model is augmented by an additional spring and inertia to represent tire stiffness and the unsprung mass of the wheel assembly, the two-degree-of-freedom model shown in FIG. 1(d) results. The consequent addition of "wheel-hop" dynamics introduces the additional constraint of maximum allowable tire deflection. Reducing the tire deflection reduces the potential for wheel-hop and results in improved vehicle handling.

To optimize the performance of the 2 DOF model of FIG. 1(d), a further term which takes into account the tire deflection $X_1$ is added to reflect vehicle handling in addition to ride comfort as indicated by the sprung mass acceleration U and the rattlespace stroke constraint $X_3$, resulting in the following performance index expression:

$$P.I. = u_{rms}^2 + r_1 x_{1,rms}^2 + r_2 x_{3,rms}^2 \qquad (2)$$

The values $r_1$ and $r_2$ are the "tuning" parameters that control the optimal tradeoff between acceleration, suspension stroke, and tire deflection. Reducing $r_1$ while keeping $r_2$ constant results in increased tire deflection and decreased sprung mass acceleration. On the other hand, reduction of $r_2$ while keeping $r_1$ constant leads to increased suspension deflection and decreased accelerations[14]. Simultaneously increasing both $r_1$ and $r_2$ creates a stiffer or harsher suspension, but decreases both tire deflection and the suspension stroke.

In the extreme case of $r_2 = 0$, the problem becomes a degenerate one where extremely large suspension strokes are possible since the suspension force is not a function of suspension stroke and thus cannot give static support for the vehicle weight. Indeed, it has been shown that there is no incentive to increase $r_1/r_2$ above 1000, since then the acceleration and tire deflection remain practically constant in that range, while the suspension deflection increases significantly [14]. Similar problems do not occur if only $r_1 = 0$, and this case can be used for preliminary suspension design, as was done for example in Reference [3].

THE ADVANTAGE OF A CONSTANT $r_1/r_2$ RATIO

Using computer-aided design software, such as Matrixx [12], optimum systems can be designed using the performance index equation (2) above, as described in [14]. A more realistic approach, which somewhat compromises the suspension and tire deflections, is to use a constant weighting ratio $r_1/r_2$. In that case, since only one parameter needs to be tuned to obtain the optimal performance, the adaptive active suspension control algorithm can be greatly simplified. In accordance with an important underlying principle of the present invention, it has been found that, by maintaining the ratio $r_1/r_2$ near the value 10, near optimal results are obtained over a wide range of conditions while significantly reducing the computational burden placed on the control processor.

The full advantage of active suspensions stems from possible adaptive tuning of controller parameters depending on driving conditions. For example, if the steering wheel sensor indicates operation on a straight section of the road, where handling is less critical, then it may be possible to increase the wheel-hop constraint. The exact amount of wheel-hop that can be tolerated for different driving conditions should be determined through vehicle tests. The important conclusion which may be drawn from the studies reported in [14] is that, with active suspensions, one can trade approximately each 1% increase in tire deflection with 1 to 1.4% decrease in rms acceleration, a result not possible with conventional, passive suspensions. In addition to different driving conditions, the active suspension can adapt to different road quality. The road roughness can be inferred through tire or suspension deflection measurements combined with digital signal processing, or simply by monitoring the wheel-hop level crossing possibly combined with well-known relations such as the above 99.7% time expression.

SYSTEM OVERVIEW

The major components of the preferred embodiment of the invention are illustrated in FIG. 2 of the drawings. Sensors provide information to a microcontroller 100 which is processed to generate control signals applied to an active actuator 105 which typically takes the form of one or more electric motors or hydraulic pistons which apply forces having a magnitude responsive to the control signal input between a wheel 110 and the sprung mass 115 of the vehicle body. An accelerometer or the like attached to the body mass 115 supplies a signal via control input 121 to the microcontroller 100 which indicates the instantaneous sprung mass acceleration (from which the sprung mass acceleration, as well as the sprung mass velocity) can be determined. A further sensor provides a control signal on input 122 indicating the stroke (wheel displacement with respect to the body), from which the stroke value can be determined. An accelerometer or the like mounted on the wheel 110 provides a signal on line 123 indicating the unsprung mass acceleration, from which the unsprung mass acceleration or velocity can be determined. The deflection exhibited by the pneumatic air cushion of tire 110 may be estimated in the manner to be described.

The desired suspension stiffness and other characteristics may be adaptively adjusted based on the estimated road roughness taken with vehicle speed as indicated by a signal source 125 and steering wheel angle as indicated by a signal source 127. As discussed in more detail below, this adjustment is accomplished by adaptively varying the suspension system's feedback control gain variables which are stored in the memory 130 seen in FIG. 2 (along with other control and configuration values). Based on the sensor inputs and the values of the adaptive parameters 130, the microcontroller 100 generates an actuator motion control signal which is applied to the actuator 105 via output line 140 seen in FIG. 2.

As discussed above, by employing a constant weighting ratio $r_1/r_2$, the computational burden on the microcontroller is substantially reduced. The microcontroller 100 selects the optimum control gains in response to predicted tire deflection or suspension stroke displacement, either by continuously adjusting the control gains or by altering the gains whenever the predicted stroke or tire deflection values vary outside of preset limits. In this way, the stiffness and other dynamic characteristics of the suspension system are altered in response to driving conditions while preserving the desired relative relationship between tire deflection and stroke displacement while minimizing the computational burden on the microcontroller.

Figure 3:
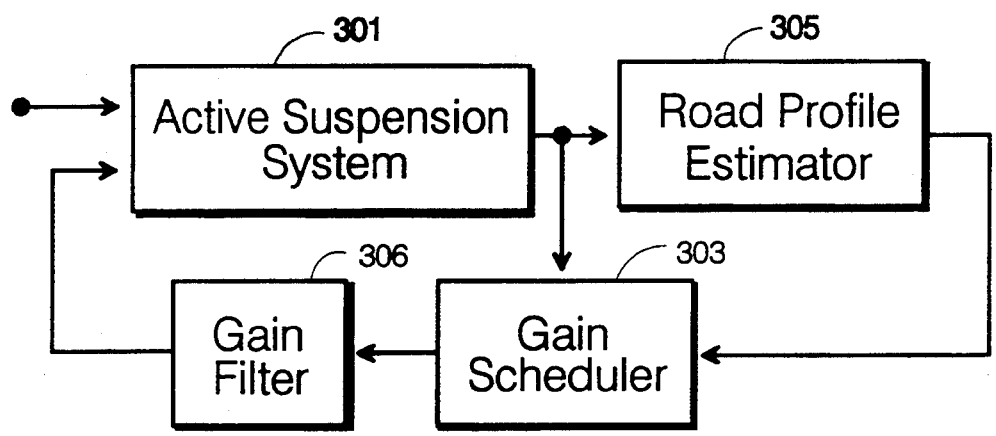
FIG. 3 is a block diagram of the major components of an adaptive, gain scheduling suspension system according to the invention.
Figure 4A:
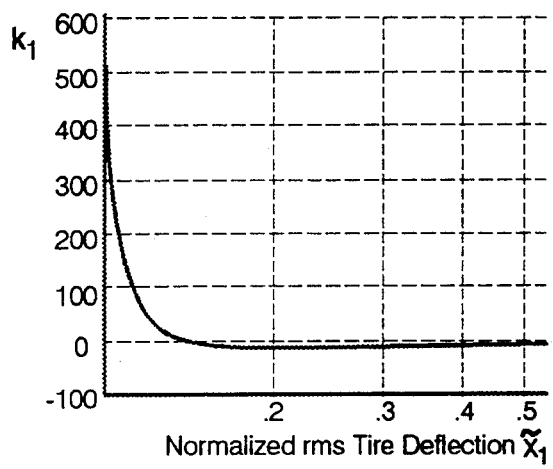
FIGS. 4(a)-4(d) show illustrative relationships between normalized tire deflection values and the gain constants.
Figure 4B:
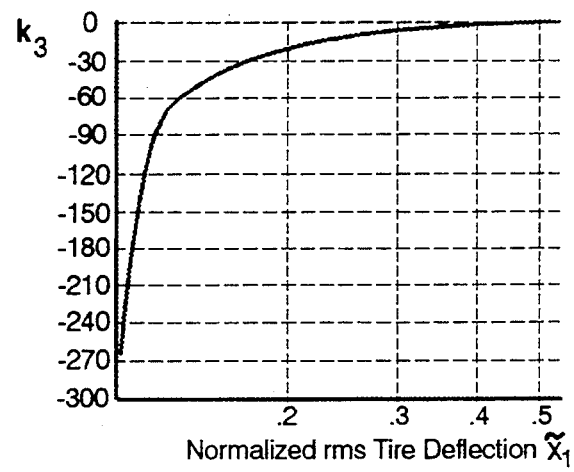
Figure 4C:
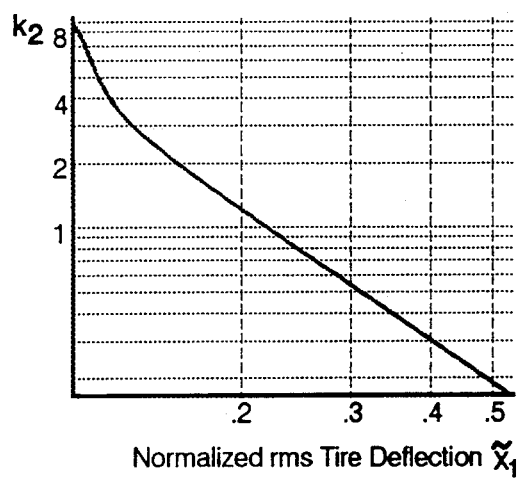
Figure 4D:
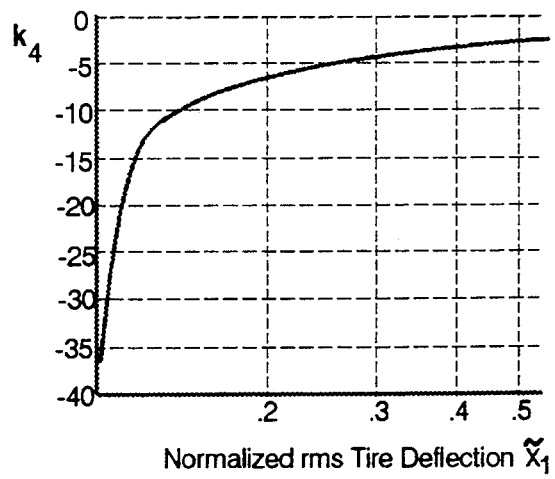

FIG. 3 of the drawings is a block diagram showing the four main components of an adaptive, gain-switching control system which implements the principles of the invention. The active suspension mechanism 301 behaves in accordance the two-degree-of-freedom model depicted in FIG. 1(d) in which the actuator force S minimizes the performance index given in equation (2) to minimize body acceleration, stroke and tire deflection in accordance with the desired relative significance set by $r_1$ and $r_2$. The operation of the active suspension system 301 is governed by feedback control gain values supplied by an adaptive gain scheduler 303 which, in turn, is controlled by an estimate of expected road roughness generated by a road profile estimator 305 based on the vehicle model. The gain filter 306 prevent jerky responses to instantaneous gain changes from the scheduler 303 when road condition range limits are crossed.

The system for adapting the control gains supplied to the active suspension system 301 is based on the recognition that the relative weight assigned to stroke and tire deflection should remain at a constant preferred value (e.g., $r_1/r_2 = 10$) as the characteristics of the suspension system are varied under changing road conditions to insure that both suspension stroke and tire deflection are maintained within specified limits. Although a number of measurable variables can be used alone or in combination to control the variation in the suspension system's control gains to vary stiffness and other characteristics, substantial improvement in suspension system's performance may be achieved by adaptively altering the control gains in response to changes in a single variable indicating the expected "road profile". However, given adequate computational capabilities, a more refined estimate of the expected demand to be placed on the suspension system can be derived by additionally accounting for variations in vehicle speed and steering wheel angle, as indicated at 125 and 127 in FIG. 2. In the arrangement shown in FIG. 3, control gains may be varied in discrete steps in response to a road profile estimate or, in the alternative, the control gains may be varied continuously in response to a repeatedly updated prediction of the input road velocity function.

CONTROL GAIN DETERMINATION

The control gains are a set of parameters $K_i$ supplied to the active suspension system 301 to control its stiffness and dynamic behavior. The control gain values may be advantageously stored in lookup tables from which they may be retrieved based on the value of the normalized rms tire deflection or the normalized stroke displacement, depending upon which one is closer to its corresponding limits. Typical lookup table values are shown in FIG. 4 which comprises four graphs illustrating the variation of the values of $K_1$, $K_2$, $K_3$ and, $K_4$ plotted with respect to normalized tire deflection. The values of the gain coefficients produced at the output of gain scheduler 303 for a given normalized tire deflection are pre-calculated using the method described in Appendix C of [14] which is summarized briefly below:

Using the model variable designations seen in FIG. 1(d), the equation describing the quarter-car, 2 degree-of-freedom active suspension is:

$$\dot{x} = A_a x + B u + \Gamma w \quad (3)$$

where $$A_a = \begin{bmatrix} 0 & 1 & 0 & 0 \\ -w_1^2 & 0 & 0 & 0 \\ 0 & -1 & 0 & 0 \\ 0 & 0 & 0 & 0 \end{bmatrix}, B = \begin{bmatrix} 0 \\ \rho \\ 0 \\ -1 \end{bmatrix} \Gamma = \begin{bmatrix} -1 \\ 0 \\ 0 \\ 0 \end{bmatrix}, \text{ and} \quad (4)$$

$$\omega_1 = \sqrt{\frac{k_{us}}{m_{us}}}, \rho = \frac{m_s}{m_{us}}$$

The optimal control (acceleration) minimizing the performance index P.I. (equation 1) is given in terms of the feedback law:

$$\mu_{LQ} = -Kx, K = R^{-1}B^t p \quad (5)$$

where P is the symmetric positive definite solution of the algebraic Riccati equation:

$$PA_a + A_a^t P - PBR^{-1}B^t p + Q = 0$$

with

The individual control gain values K which provide this optimal actuator force (sprung mass acceleration) $\mu_{LQ}$ are $$Q = \text{diag}[r_1 0 r_2 0], R = 1 \quad (7)$$

preferably pre-calculated for the particular physical system, stored in a table in memory indexed by the corresponding expected tire deflection and stroke displacement values, and then retrieved for use as the expected tire deflection values are recalculated while the vehicle is in motion over changing road surfaces.

DISCRETE ROAD PROFILE ESTIMATION

The gain scheduler 303 seen in FIG. 3 derives the expected normalized suspension stroke based on a road profile estimate supplied bey the estimator 305. Gain scheduler 303 may be advantageously adapted to adjust the control gains to predetermined discrete levels to increase or decrease suspension stiffness so that the stroke and tire deflection remain within desired constraints. By employing limited sets of predetermined discrete control gain values, the amount of computation required may be significantly reduced. The control gains are switched when the estimated stroke and deflection values (which are derived from the estimated road profile value provided by the estimator 305) depart from predetermined range limits, the control gains being switched only when these limits are crossed. In order to prevent jerky behavior when control gains are changed, the gain filter 306 operates as a low pass filter (having a bandpass of, say, 1 Hz.) which smoothes the control gain transitions.

Although several sophisticated road profile estimation techniques are disclosed in the literature, a preferred computational method employs one of the known transfer functions between ground velocity $W_{(s)}$ and some measurable variable, such as suspension stroke displacement or unsprung mass acceleration. By taking a series of samples of the measurable variable, an rms ground velocity value may be calculated based on these samples. The expected normalized tire deflection and normalized suspension stroke are then calculated by the gain scheduler 303 using the relations:

$$\tilde{x}_{1,\text{expt}} = \frac{X_{1,\text{rms}}^{\text{max}}}{\hat{\sigma}_N \sqrt{T}} \text{ and } \tilde{x}_{3,\text{expt}} = \frac{X_{3,\text{rms}}^{\text{max}}}{\hat{\sigma}_N \sqrt{T}} \quad (8)$$

where $$X_{1,\text{rms}}^{\text{max}} = \frac{\text{maximum allowable top-to-bottom tire deflection}}{6}$$

$$X_{3,\text{rms}}^{\text{max}} = \frac{\text{maximum allowable top-tobottom suspension stroke}}{6}$$

$\hat{\sigma}_N$ = estimated r.m.s. ground velocity based on N samples
T = duration of the sampling interval.

In practice, it has been found that N = 1000 samples, so that T = 0.004 seconds, provides satisfactory results.

DISCRETE GAIN SCHEDULING

Figure 5A:
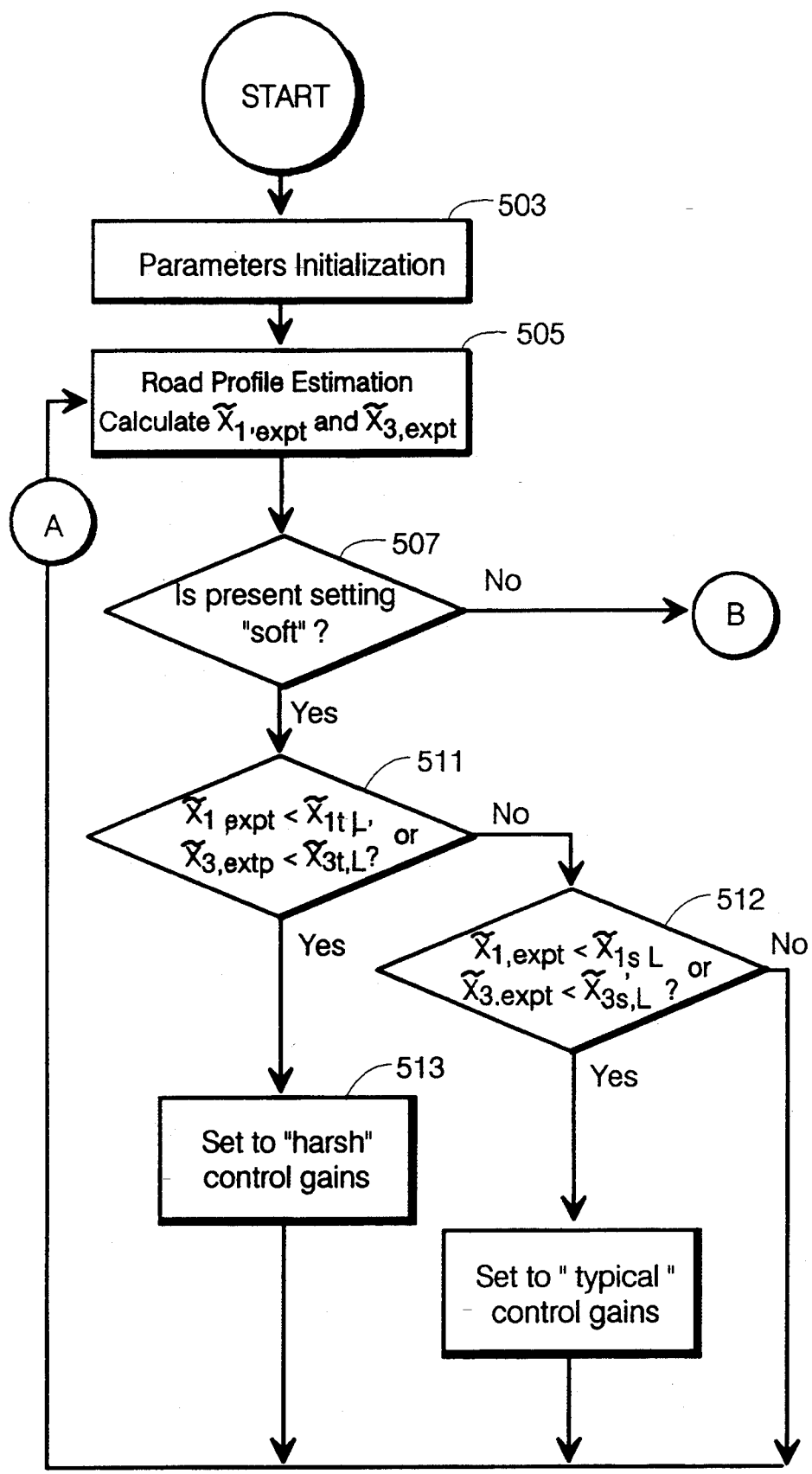
FIGS. 5(a)-5(c) are flow charts illustrating the manner in which control gains may be adaptively varied in response to three detected ranges of driving conditions to provide soft, typical or stiffened suspension characteristics.
Figure 5B:
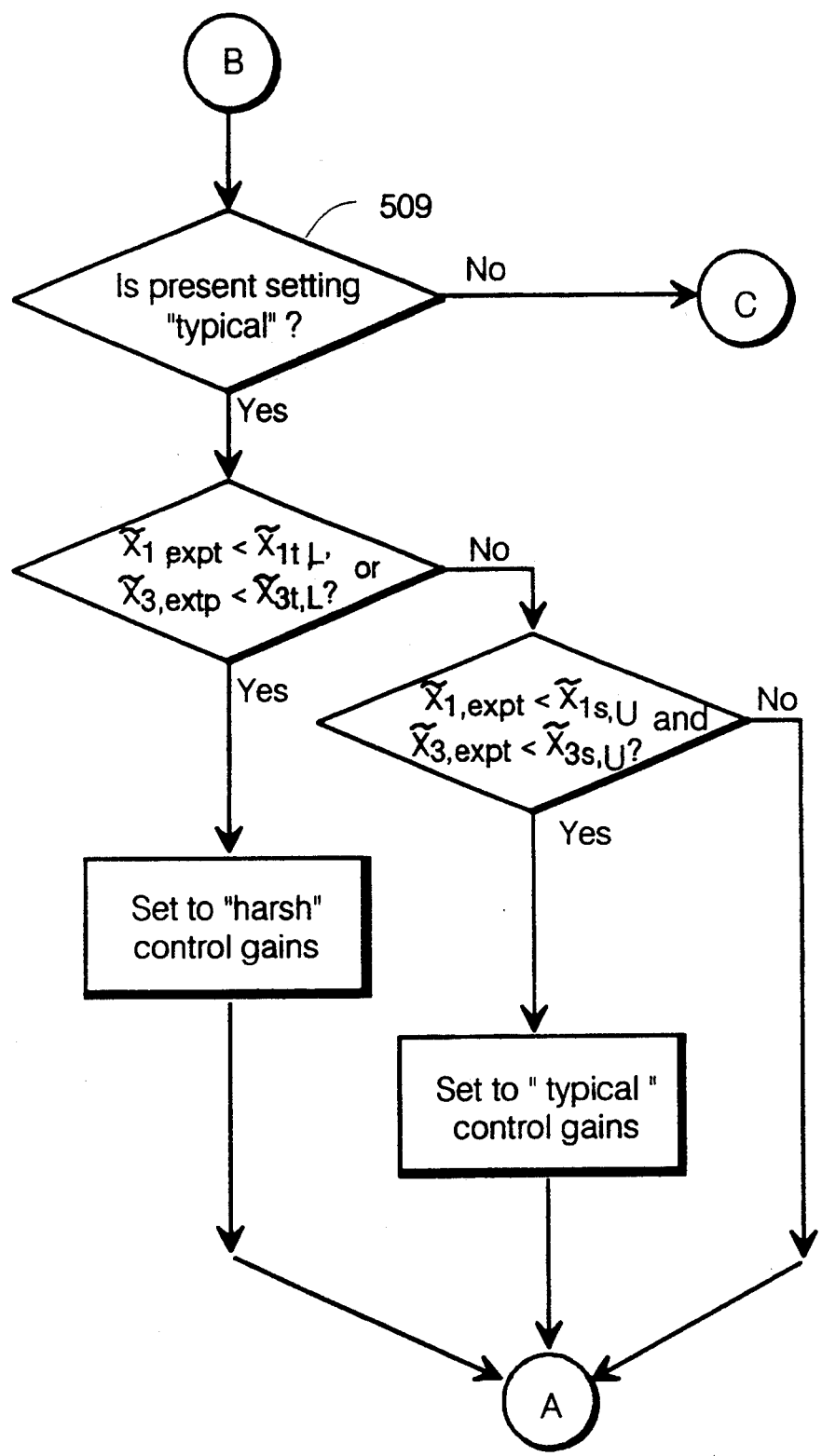
Figure 5C:
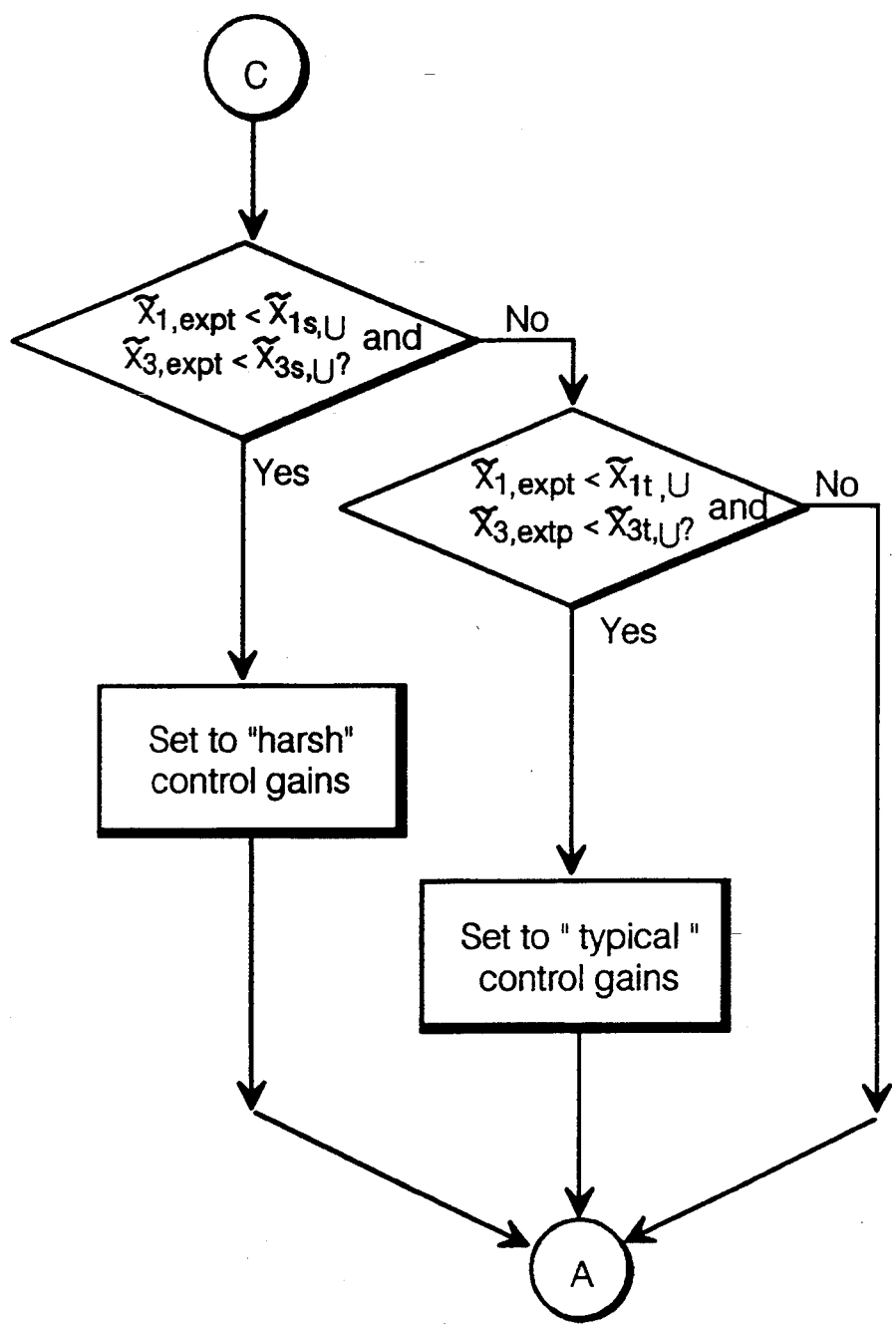
Figure 6A:
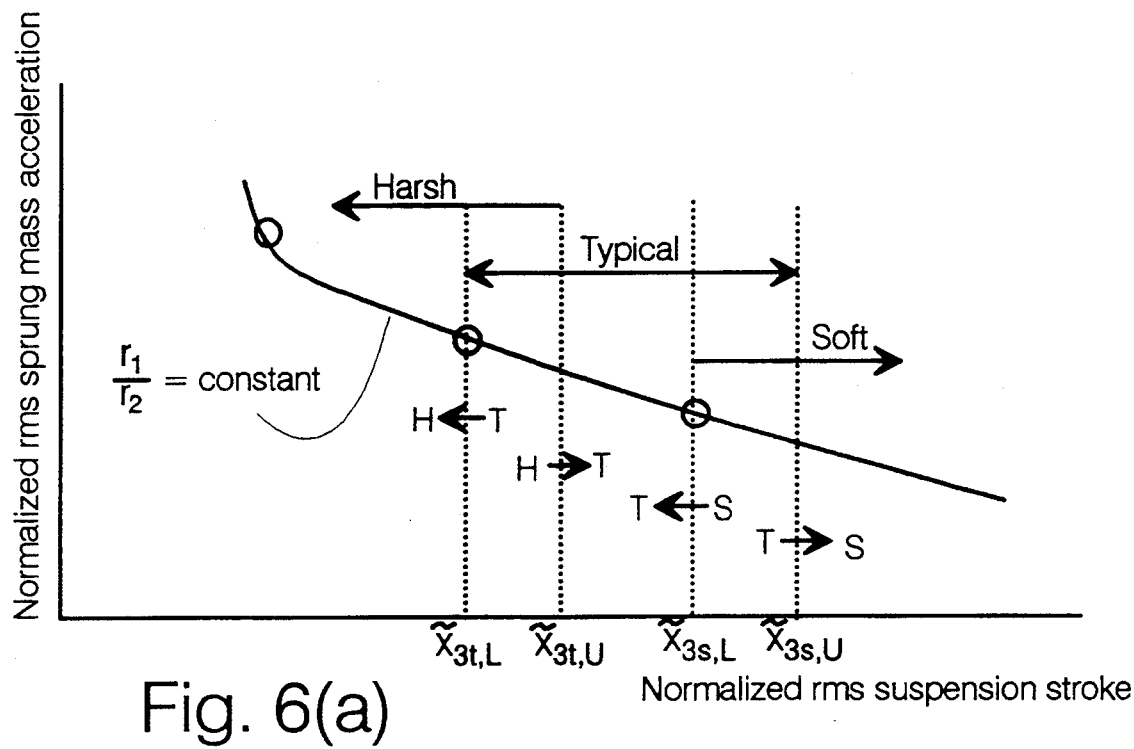
FIGS. 6(a)-6(b) illustrate the manner in which, in the adaptive suspension system, passenger comfort (as indicated by sprung mass acceleration) varies in relation to changes in tire deflection and stroke displacement as the system operates in different ranges of dynamic characteristics.
Figure 6B:
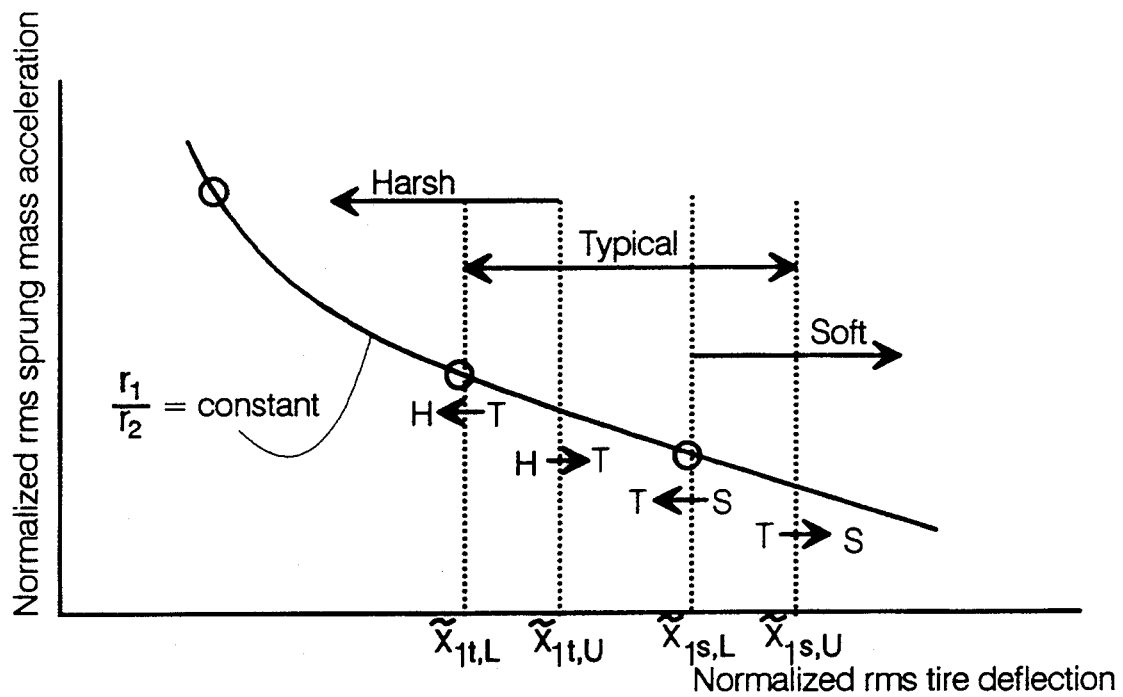

The flowchart shown in FIGS. 5(a)–(c), together with the graphs seen in FIGS. 6(a)–(b), illustrate a first preferred embodiment of the adaptive suspension system which employs a gain-switching (as opposed to continuous gain adjustment) mechanism. As seen in FIG. 5(a), the process for determining the suspension system control gains begins at the entry point labeled "START". Parameters in the form of configuration data which describes the particular vehicle suspension system are initialized and process variables are set to "typical" default values to provide initial conditions, as indicated at 503.

After the normalized tire deflection and normalized stroke are calculated using the method described above, the nature of the next processing steps depends on whether the suspension system is currently "soft", "typical" or "harsh" If "soft" decision block 507 seen in FIG. 5(a) is answered Yes, and processing continues as shown in FIG. 5(a). If the current setting is "typical", decision block 509 in FIG. 5(b) is answered Yes, and processing continues as shown in FIG. 5(b). Otherwise, processing continues at the entry point C seen in FIG. 5(c).

The processing seen shown in FIG. 5(a) illustrates the manner in which the expected normalized tire deflection and the expected normalized stroke displacement are compared with predefined range limits to determine whether a switch to "typical" or "harsh" control gain values is appropriate when current setting is "soft". A test is made at decision block 511 in FIG. 5(a) to determine if the normalized tire deflection is less than a predetermined lower bound established at initialization for the "typical" range, in which case the control gains are switched to their harsh settings as seen at block 513 in FIG. 5(a). If a harsh setting is not indicated, a test is made at 512 to determine if the expected normalized suspension stroke calculated at 505 is less than the lower boundary of the "soft" range for suspension stroke, in which case the control gains are set to pre-calculated values optimized for "typical" conditions. Otherwise, the existing "soft" control gains continue to govern the dynamic performance of the system.

The relationship between the overlapping ranges of values for estimated normalized stroke and tire deflection is illustrated in FIGS. 6(a) and 6(b) respectively. As long as these estimated values remain within the ranges which match the current settings established by the existing set of gain controls, no adaptive changes occur. However, if the estimated value of either normalized stroke or normalized tire deflection crosses an outer boundary of the current setting range, the control gains are switched to new values. Thus, for example, if the control gains have been set to values appropriate for "typical" road profile conditions, and rough road conditions are encountered so that the estimated rms ground velocity increases, a decrease in both the expected normalized stroke and normalized tire deflection is calculated. If this computed decrease in either normalized variable is sufficient to cross the lower boundary of the "typical" range seen in FIGS. 6(a) and 6(b), the control gains are switched to their "harsh" settings. Here, the difference between upper and lower boundary settings for adjacent ranges provides "hysteresis" is used to prevent the annoying hunting which can otherwise occur when the gains are continuously switched back and forth between two regions.

CONTINUOUS ROAD PROFILE ESTIMATOR

When adequate computational capacity is available, it is advantageous to continually update the control gains supplied to the suspension system. As discussed above and illustrated in FIG. 4, precalculated, stored control gains may be retrieved from a lookup table based on the current estimate of normalized tire deflection. To continually update the needed normalized tire deflection value, it is necessary to continuously form an accurate estimate of the rms ground velocity based on a sequence of estimated road velocity values. This may be accomplished by processing the suspension stroke variable by using the transfer function $E_{(s)}$ which expresses the relationship between input road velocity and stroke displacement:

$$E(s) = \frac{w(s)}{x_3(s)} = \frac{s^4 + (k_2\rho - k_4)s^3 + [\omega_1^2 + (k_1 - k_3)\rho - k_3]s^2 + (-k_4\omega_1^2)s}{([-\omega_1^2 - k_1(1+\rho)]s + (k_4 + k_2)\omega_1^2)\left(\frac{s}{p_1} + 1\right)\left(\frac{s}{p_2} + 1\right)} \quad (10)$$

where is the sprung to unsprung mass ration $m_s/m_{us}$, 1 is the tire natural frequency, and the $k_i$ values are the control gains currently in effect, and the $P_i$ values are poles added to make the relationship proper. When the system is first placed in operation, "typical" default gain values are used in the calculation of sample data points. This group of data is then used to estimate a value for normalized rms ground velocity $w_{rms}$, which is in turn used to estimate the normalized rms tire deflection value given by:

$$\bar{\tilde{x}}_1 = \frac{x_{1,rmsmax}}{w_{rms}\sqrt{dt}} \quad (11)$$

where $x_{1,rms,max}$ is the maximum allowable rms tire deflection.

The normalized tire deflection and stroke displacement values may then be used directly as index values for retrieving the corresponding control gain values from memory, thereby continuously adapting the dynamic behavior of the active suspension system to match changing driving conditions.

It is to be understood that the methods and apparatus which have been described are merely illustrative applications of the principles of the invention. Numerous modifications to the systems disclosed may be made by those skilled in the art without departing from the spirit and scope of the invention.

What is claimed is:

1. An active vehicle suspension system comprising, in combination,
   a vehicle body,
   a pneumatic tire,
   a mechanical suspension system for mounting said tire for movement with respect to said body, said mechanical suspension system including an active suspension actuator coupled to a source of motive power for applying forces between said tire and said body in response to a control signal,
   first sensing means for producing an input signal quantity A indicative of the acceleration being experienced by said vehicle body,
   second sensing means for producing an input signal quantity D indicative of the deflection being experienced by the given tire moved in response to said control signal,
   third sensing means for producing an input signal quantity S indicative of the displacement of said tire from an equilibrium position, means coupled to said first, second and third sensing means for varying the magnitude of said control signal to vary said forces applied between said tire and said body to minimize the quantity $A+(r_1D)+(r_2S)$ where the quantities $r_1$ and $r_2$ are parameters controlling the relative significance of A, D and S, means for generating a road profile value indicative of the surface characteristics of the road over which said vehicle is traveling, and means responsive to said road profile value for simultaneously altering the quantities $r_1$ and $r_2$ while keeping the ratio $r_1/r_2$ substantially constant to vary the effective stiffness characteristics of said active suspension system.

2. An active suspension system as set forth in claim 1 wherein said means for altering the quantities $r_1$ and $r_2$ comprises, in combination, means for computing a plurality of control gain values effective to substantially minimize said quantity $$A+(r_1D)+(r_2S)$$

for a plurality of index values of corresponding to different $r_1$ and $r_2$ values, memory means for storing said computed control gain values, and means for retrieving different ones of said control gain values in response to said road profile value.

3. An active suspension system as set forth in claim 2 wherein said means for retrieving different ones of said control gain values includes means for comparing said road profile value with boundary values and for retrieving different control gain values when said road profile value lies outside a range defined by said boundary values.

4. An active suspension system as set forth in claim 3 wherein said boundary values establish overlapping ranges to provide hysteresis to prevent said control gain values from being repeatedly altered when said profile value is approximately equal to one of said boundary values.

5. An active suspension system as set forth in claim 1 wherein said means responsive to said road profile value for simultaneously altering the quantities $r_1$ and $r_2$ while keeping the ratio $r_1/r_2$ substantially constant maintains said ratio at about the value 10.

6. An active suspension system as set forth in claim 4 wherein said means responsive to said road profile value for simultaneously altering the quantities $r_1$ and $r_2$ while keeping the ratio $r_1/r_2$ substantially constant maintains said ratio at about the value 10.

7. A vehicle suspension system for a movably mounting a pneumatic tire with respect to the body of a vehicle, said suspension system comprising, in combination, a powered actuator for applying a force between said tire and said body, the magnitude of said force being determined by a control signal, sensors for monitoring the motion of said vehicle body and said tire, a processor connected to said sensors for delivering said control signal to said powered actuator to create a force having a magnitude which minimizes a performance index formed by the weighted combination of three values, the first value representing the acceleration of said vehicle body, the second value representing the deflection of the air cushion of said pneumatic tire, and the third value representing the displacement of said tire with respect to said vehicle body, means for forming a quantity indicative of the roughness of the road currently being traversed by said vehicle, and means responsive to said quantity for adaptively altering the effective stiffness of said vehicle suspension system by altering said first value relative to said second and third values while maintaining a substantially constant ratio between said second and third values.

8. A vehicle suspension system as set forth in claim 7 further comprising, in combination, a memory connected to said processor for storing a plurality of sets of control gain values, said gain values being precomputed to minimize said performance index for different road roughness conditions, and means responsive for supplying a selected one of said sets to said processor in response to said quantity.

* * * * *